Figure 1:
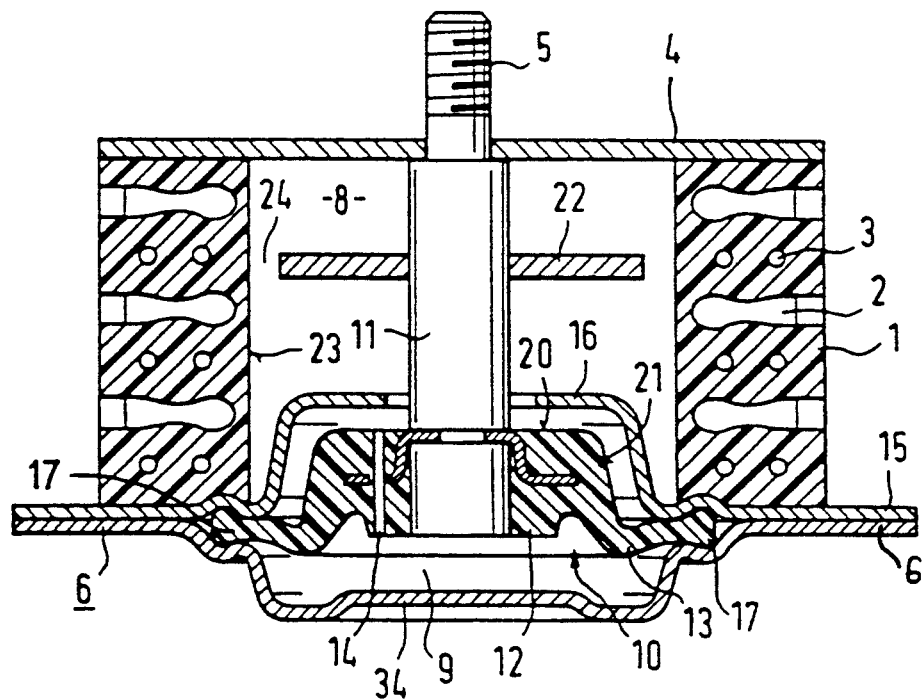

United States Patent [19]

Hofmann et al.

[11] Patent Number: 5,284,315
[45] Date of Patent: Feb. 8, 1994

[54] ELASTIC ENGINE MOUNT

[75] Inventors: Manfred Hofmann, Hünfelden; Rainer Steffens, Hillscheid; Wolfgang Sauer, Puderbach, all of Fed. Rep. of Germany

[73] Assignee: Metzeler Gimetall AG, Munich, Fed. Rep. of Germany

[21] Appl. No.: 950,201

[22] Filed: Sep. 24, 1992

[30] Foreign Application Priority Data

Sep. 24, 1991 [DE] Fed. Rep. of Germany ....... 4131771

[51] Int. Cl.⁵ .......................................... F16M 13/00
[52] U.S. Cl. .................................. 248/562; 248/632; 248/636; 248/638; 267/141
[58] Field of Search ............... 248/659, 632, 635, 610, 248/562, 638, 636; 267/141.2, 141.1, 141.3, 141.4, 141.6, 140.11, 141

[56] References Cited

U.S. PATENT DOCUMENTS

| | | | |
|---|---|---|---|
| 2,202,940 | 6/1940 | Armington | 267/141.3 |
| 4,645,188 | 2/1987 | Jordens | 248/562 X |
| 4,895,115 | 1/1990 | Weber | 267/141.3 X |
| 5,102,105 | 4/1992 | Hamaekers | 248/562 X |
| 5,127,636 | 7/1992 | Spaltofski | 267/140.11 X |

FOREIGN PATENT DOCUMENTS

| | | | |
|---|---|---|---|
| 402919 | 12/1990 | European Pat. Off. | 267/140.11 |
| 0439794 | 8/1991 | European Pat. Off. | |
| 4002357 | 1/1991 | Fed. Rep. of Germany | |
| 88833 | 4/1987 | Japan | 248/562 |
| 278334 | 12/1987 | Japan | 248/562 |
| 2243330 | 3/1990 | United Kingdom | |

*Primary Examiner*—J. Franklin Foss
*Attorney, Agent, or Firm*—Herbert L. Lerner; Laurence A. Greenberg

[57] ABSTRACT

An elastic engine mount includes upper and lower bearing plates. A hollow-cylindrical spring block has top and bottom ends being clamped between the bearing plates and defining an inner space. A bolt protrudes into the inner space from the upper bearing plate. The spring block is formed of an elastomer and has conduits formed therein with at least one open end and a varying cross section. The conduits are disposed in a plurality of planes and are mutually parallel within each respective plane. A transverse elastic wall for additional damping is centrally fixed to the bolt for dividing the inner space into two liquid-filled chambers. The elastic wall has through openings formed therein and has an outer periphery clamped between the lower bearing plate and the bottom end of the spring block.

6 Claims, 1 Drawing Sheet

ELASTIC ENGINE MOUNT

The invention relates to an elastic engine mount having a hollow-cylindrical spring block made of an elastomer, in which small conduits are provided in a plurality of groups of planes, each of the conduits being parallel within one plane, open at least at one end and having a varying cross section, and the spring block being fastened between two bearing plates.

Such an engine mount is known from German Patent DE 40 02 357 C1, corresponding to Published European Application No. 43 97 94 and Published British Application No. 90 06 554. That kind of a mount, which is also known as a soft mount, has very good damping in the acoustical range and with a suitable formation of the molded-in conduits, with a continuous transition from one cross section to the next, it has a smooth transition to higher spring stiffnesses.

Due to the relative softness of such spring blocks, they provide virtually no damping for low-frequency vibration, even though they have optimal damping action for structure-borne sound. Yet such damping is needed for high-powered and Diesel vehicles, and specifically damping of stuttering of the engine at 7 Hz and of load changes at approximately 2 to 3 Hz.

It is accordingly an object of the invention to provide an elastic engine mount, which overcomes the hereinafore-mentioned disadvantages of the heretofore-known devices of this general type and which does so in such a way that it also has adequate damping in the desired frequency range, without particularly increasing its structural volume.

With the foregoing and other objects in view there is provided, in accordance with the invention, an elastic engine mount, comprising upper and lower bearing plates, a hollow-cylindrical spring block having top and bottom ends being clamped between the bearing plates and defining an inner space, a bolt protruding into the inner space from the upper bearing plate, the spring block being formed of an elastomer and having conduits formed therein with at least one open end and a varying cross section, the conduits being disposed in a plurality of groups of planes and being mutually parallel within each respective plane, and a crosswise or transverse elastic wall for additional damping being centrally fixed to the bolt for dividing the inner space into two liquid-filled chambers, the elastic wall having through openings formed therein and having an outer periphery clamped between the lower bearing plate and the bottom end of the spring block.

With this kind of embodiment, the high-insulation spring block is expanded through the use of simple means and is converted into a hydraulically damping single-chamber engine mount, so that the mount has both optimal damping for structure-borne sound and high damping for low-frequency, high-amplitude vibration.

In accordance with another feature of the invention, the elastic wall has a relatively thicker, middle region being fixed to the bolt and having at least one of the through openings formed therein in the form of an axially parallel-extending overflow opening, and the elastic wall has a radially outer region with a flexible, relatively thinner wall to be bulged outward.

In accordance with a further feature of the invention, there is provided another annular plate, the outer periphery of the elastic wall being clamped between the lower bearing plate and the other annular plate, the lower bearing plate having a central region being bulged outward in a cup shape, and the other annular plate being bulged outward in a cup shape fitting over and being spaced apart from the thicker middle region of the elastic wall forming a tension stop.

In accordance with an added feature of the invention, the spring block has an inner jacket, and there is provided an annular, radially protruding plate disposed approximately halfway up the central bolt for decoupling high-frequency vibration, the radially protruding plate having an outer periphery disposed at a distance from the inner jacket defining a free gap of given width.

In accordance with an additional feature of the invention, the upper bearing plate has an outer periphery, and there are provided hollow-cylindrical attachments each being disposed at the outer periphery of a respective one of the upper bearing plate and the radially protruding plate and being oriented toward the lower bearing plate, as a radial stop. This is done in order to equip the mount with a radial stop to counteract overly great radial deflections at the same time.

In accordance with a concomitant feature of the invention, there is provided a further elastic rubber diaphragm clamped between the elastic wall and the lower bearing plate, the lower bearing plate having ventilation bores formed therein.

Other features which are considered as characteristic for the invention are set forth in the appended claims.

Although the invention is illustrated and described herein as embodied in an elastic engine mount, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 2:
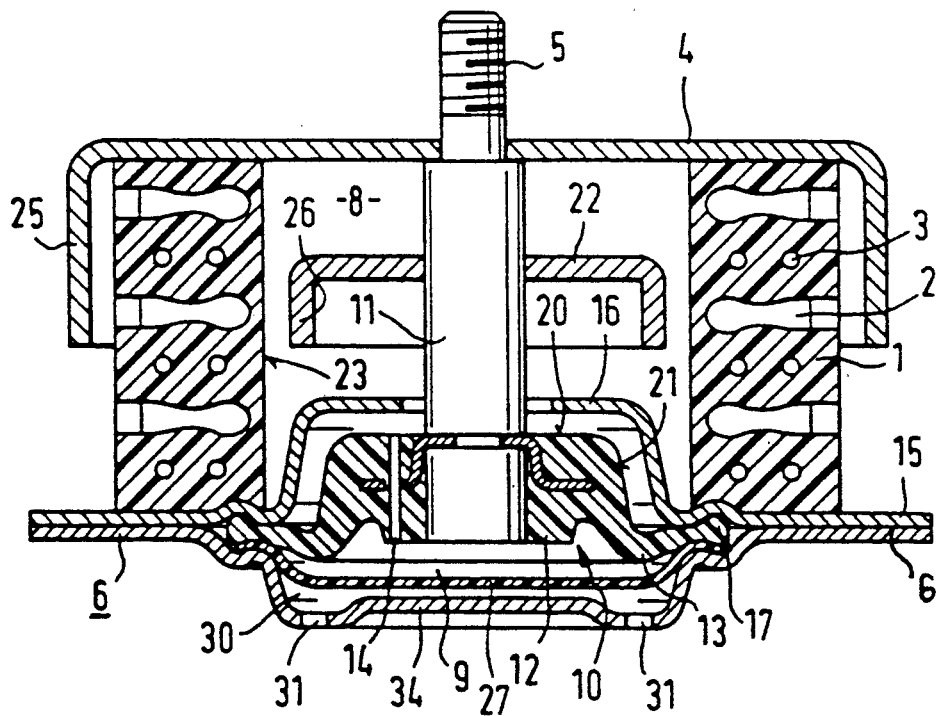

FIG. 1 is a diagrammatic, longitudinal-sectional view of a mount with an integrated hydraulic damper element; and FIG. 2 is a view similar to FIG. 1 of a further embodiment of the mount with radial stops and an additional compensation chamber.

Referring now to the figures of the drawing in detail and first, particularly, to FIG. 1 thereof, there is seen an engine mount which has a hollow-cylindrical spring block 1 made of an elastomer, that is penetrated by radial conduits 2 or conduits 3 extending parallel to one another, with an alignment which is offset by 90° each from one plane to another. These conduits 2 and 3 have a varying cross section over their length, with a smooth transition from one cross section to the next, so that upon axial compression, opposed walls of a conduit or channel successively increasingly come into contact with one another, thereby providing a smooth rise in the spring characteristic.

This spring body 1 is fastened between an upper bearing plate 4 having a central fitted bolt 5 for fixation to an engine, and a lower bearing plate 6 for fixation to a vehicle body.

Such a mount has high insulation for structure-borne sound or in other words acoustical vibration, but has no damping whatever for low-frequency, high-amplitude vibration.

In order to improve such a mount for that kind of damping as well, an inner cylindrical hollow space inside the spring body 1 is divided between the upper bearing plate 4 and the lower bearing plate 6, into an upper chamber 8 and a lower chamber 9, by a crosswise or transverse elastic wall 10. The wall 10 is fixed centrally to a bolt 11 that protrudes downward from the upper bearing plate 4. This wall 10 suitably has a thickened and practically cylindrically shaped middle region 12 and a more easily deformable outer wall region 13 radially adjoining it. The function of these regions will be described below. Coaxial bores 14 are provided inside the thickened, middle region 12. Preferably three of these bores or conduits 14 are distributed over the periphery, and thus establish fluid communication between the upper chamber 8 and the lower chamber 9. In order to obtain an adequately sized overflow chamber 9, it is practical for the lower bearing plate 6 to have a cup-shaped bulge 34 in the middle region thereof.

In order to provide better retention of the wall 10, a further annular plate 15 can be mounted on the lower bearing plate 6. An inner region of this plate 15 likewise has a cup-shaped bulge 16, which extends practically parallel to the top contour of the middle, thickened region 12 of the wall 10 and fits over it forming a tension stop. The outer periphery of the elastic wall 10 has a thickened peripheral region 17 which is fastened between these two plates 6 and 15, that are suitably welded together.

Due to the suitable shaping of the bulge 16 in the inner region of the annular plate 15, this plate acts both as a tension stop with respect to the top 20 of the wall 10 and at the same time, in the vertical region, as a radial stop with respect to the outer periphery 21 of the wall portion 12.

If low-frequency, high-amplitude vibration acts upon the upper bearing plate 4, then the bolt 11 and with it the wall 10 are pressed downward, so that liquid flows from the chamber 8 into the chamber 9 through the conduits 14, and a corresponding damping takes place during this passage because of friction losses. In the event of tensile strains on the upper bearing plate 4, an overflow then takes place in the opposite direction, from the chamber 9 into the chamber 8.

In addition, the bolt 11 is provided approximately half-way up with an annular, radially protruding plate 22, which leaves a free gap 24 of predetermined and constant width between it and an inner jacket or surface 23 of the cylindrical spring block 1. If high-frequency vibration is induced, the result is a high-frequency inertia effect, which lowers the dynamic rigidity of the mount. High-frequency vibration is thus reliably decoupled, so that the transmission of acoustical vibration is presented fluidically as well.

In the exemplary embodiment shown in FIG. 2, which is based on the same basic principle as the mount of FIG. 1, cylindrical attachments or extensions 25 and 26 are additionally provided on the outer periphery of both the upper bearing plate 4 and the annular plate 22, extending axially toward the lower bearing plate 6. These attachments serve as an additional radial stop for the upper hollow-cylindrical spring body 1.

In addition, a further flexible rubber diaphragm 27 is fastened between the wall 10 and the cup-shaped bulge or lower, outwardly curved region 34 of the bearing plate 6. This diaphragm 27 forms an outer elastic border or boundary for the lower chamber 9. A remaining hollow space 30 between the diaphragm 27 and the outward bulge 14 acts only as an air chamber, which can be kept at atmospheric pressure through the use of suitable bores 31 in the outward bulge 34 if the rubber diaphragm 27 should bulge out downward.

The overall result is accordingly an engine mount that not only has optimal damping of structure-borne sound but also good damping of low-frequency vibration, in a way that could not be achieved solely by a conventional hydraulic damping engine mount or a soft bearing.

We claim:

1. An elastic engine mount, comprising upper and lower bearing plates, a hollow-cylindrical spring block having top and bottom ends being clamped between said bearing plates and defining an inner space, a bolt protruding into said inner space from said upper bearing plate, said spring block being formed of an elastomer and having conduits formed therein with at least one open end and a varying cross section, said conduits being disposed in a plurality of planes and being mutually parallel within each respective plane, and a transverse elastic wall for additional damping being centrally fixed to said bolt for dividing said inner space into two liquid-filled chambers, said elastic wall having through openings formed therein and having an outer periphery clamped between said lower bearing plate and said bottom end of said spring block.

2. The elastic engine mount according to claim 1, wherein said elastic wall has a relatively thicker, middle region being fixed to said bolt and having at least one of said through openings formed therein in the form of an axially parallel-extending overflow opening, and said elastic wall has a radially outer region with a flexible, relatively thinner wall to be bulged outward.

3. The elastic engine mount according to claim 2, including another annular plate, said outer periphery of said elastic wall being clamped between said lower bearing plate and said other annular plate, said lower bearing plate having a central region being bulged outward in a cup shape, and said other annular plate being bulged outward in a cup shape fitting over and being spaced apart from said thicker middle region of said elastic wall forming a tension stop.

4. The elastic engine mount according to claim 1, wherein said spring block has an inner jacket, and including an annular, radially protruding plate disposed approximately halfway up said central bolt for decoupling high-frequency vibration, said radially protruding plate having an outer periphery disposed at a distance from said inner jacket defining a free gap of given width.

5. The elastic engine mount according to claim 4, wherein said upper bearing plate has an outer periphery, and including hollow-cylindrical attachments each being disposed at said outer periphery of a respective one of said upper bearing plate and said radially protruding plate and being oriented toward said lower bearing plate, as a radial stop.

6. The elastic engine mount according to claim 3, including a further elastic rubber diaphragm clamped between said elastic wall and said lower bearing plate, said lower bearing plate having ventilation bores formed therein.

* * * * *